United States Patent [19]

Szarkowski

[11] 4,067,393

[45] Jan. 10, 1978

[54] METHOD AND APPARATUS FOR HANDLING AND LAYING STRIPS OF SOD

[76] Inventor: Raphael J. Szarkowski, Rte. No. 2, Bismarck, N. Dak. 58501

[21] Appl. No.: 601,992

[22] Filed: Aug. 5, 1975

[51] Int. Cl.² .................. A01B 79/00; B65G 47/00
[52] U.S. Cl. .................... 172/1; 172/19; 214/653; 214/674; 180/27; 214/DIG. 7; 214/152
[58] Field of Search ............... 214/650-654, 214/660, 670-674, DIG. 7, 75 R, 75 H, 75 G; 180/27; 187/9 R; 172/1, 19, 20

[56] References Cited

U.S. PATENT DOCUMENTS

| | | | |
|---|---|---|---|
| 1,738,272 | 12/1929 | Abbe | 187/9 R |
| 2,539,233 | 1/1951 | Dickson | 214/654 |
| 3,184,089 | 5/1965 | Le Tourneau | 214/670 |
| 3,220,368 | 11/1965 | Gandrud | 172/1 X |
| 3,454,176 | 7/1969 | Landeborg et al. | 180/27 X |
| 3,512,599 | 5/1970 | Hott et al. | 180/27 |
| 3,521,780 | 7/1970 | Cook | 214/674 |
| 3,563,012 | 2/1971 | Strasel | 180/27 |
| 3,695,374 | 10/1972 | Commons | 180/27 |
| 3,790,013 | 2/1974 | Smith | 214/654 X |
| 3,797,684 | 3/1974 | Brandt | 214/654 |
| 3,861,535 | 1/1975 | Huxley et al. | 214/670 |
| 3,866,780 | 2/1975 | Miller et al. | 214/655 |
| 3,887,013 | 6/1975 | Helberg | 214/6 DK |
| 3,946,824 | 3/1976 | Jester et al. | 180/27 |

FOREIGN PATENT DOCUMENTS

| | | | |
|---|---|---|---|
| 524,626 | 12/1953 | Belgium | 214/674 |
| 1,338,640 | 8/1963 | France | 214/653 |
| 316,722 | 10/1969 | Sweden | 214/670 |
| 947,286 | 1/1964 | United Kingdom | 214/674 |

Primary Examiner—Robert J. Spar
Assistant Examiner—R. B. Johnson
Attorney, Agent, or Firm—Dugger, Johnson & Westman

[57] ABSTRACT

A sod handling machine similar to fork lift truck which permits the handling of pallets of sod without loss of sod from the pallet, and further includes flotation tires arranged to permit the machine to be used for packing the sod after it has been laid. Thus the machine serves as a transport and as a packer.

9 Claims, 9 Drawing Figures

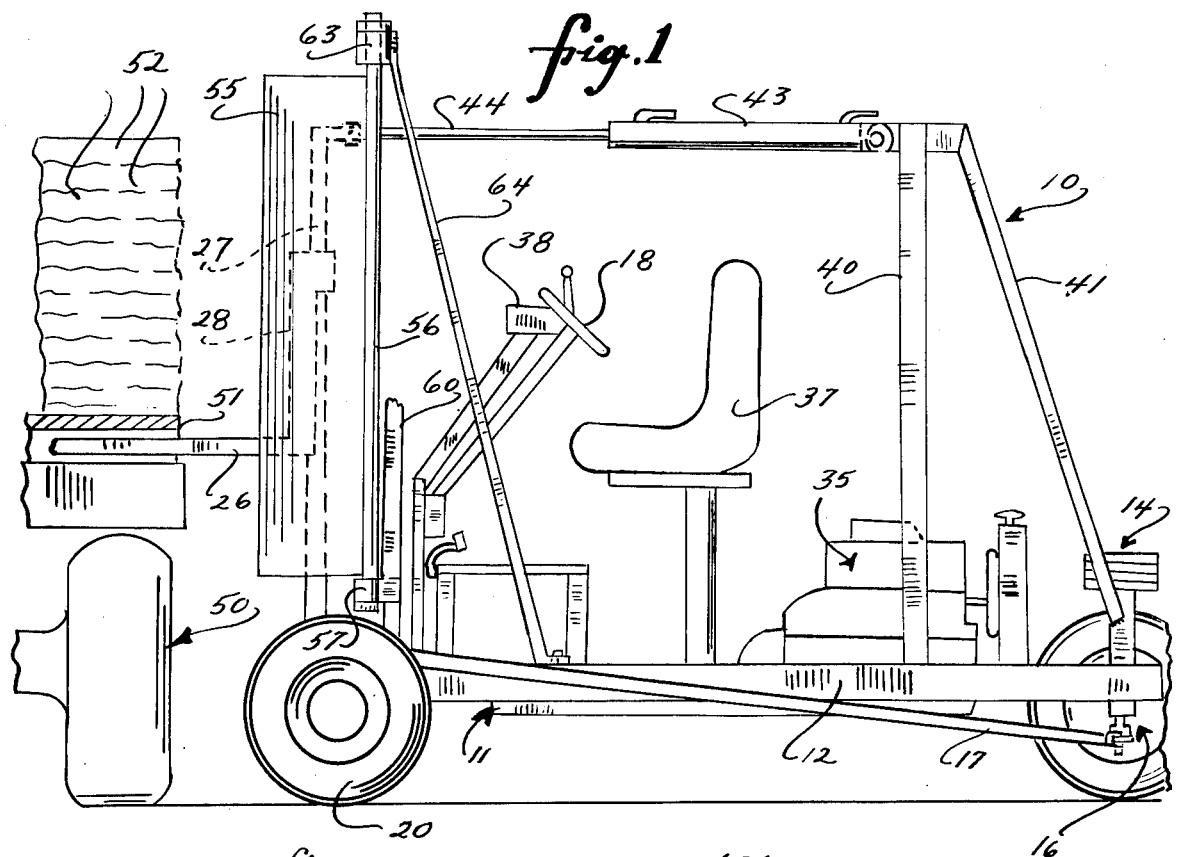

METHOD AND APPARATUS FOR HANDLING AND LAYING STRIPS OF SOD

BACKGROUND OF THE INVENTION

As presently is known, sod handling has been largely manual, and the laying of sod involves a great deal of labor. It has been previously well known to handle sod in rolls, loading the rolls onto pallets and then putting the pallets onto a truck. Fork lift trucks of conventional design have been used for this, but have limitations because the sod will tend to fall off the pallets as it is being loaded and unloaded by the truck. If a conventional fork lift truck is used to carry the pallets, the sod generally does fall off.

Thus, conventional fork lift trucks have been unable to achieve the results of handling sod easily.

SUMMARY OF THE INVENTION

The present invention relates to sod handling apparatus of the lift truck type which includes mechanism for specifically handling sod. The sod can be placed on pallets, loaded onto a truck and unloaded with the device of the present invention without fear of losing pieces of sod. The unit also can be used for holding the sod supply while laying the sod manually if desired. The sod can be removed directly from the pallet while being supported on the forks of the machine disclosed. The machine can be driven along as the sod is removed to minimize carrying the sod. Then because of the floatation tires and the arrangement of these tires the machine of the present invention can be used for packing or rolling the sod after it has been laid into place.

The present device comprises a mobile machine which operates in a manner similar to a lift truck, and which includes lift fork members at the front that will tilt a substantial number of degrees up and rearwardly. A pair of side holding plates are provided adjacent the sides of the forks and as the forks are tilted up and rearwardly the sod on a pallet on the forks will be squeezed by the plates. The plates are pivotally mounted to automatically tighten the sides of a pallet full of sod to hold the sod in place as the fork is tilted back.

When the device is used for unloading from a truck, the rearward tilting, and consequent actuation of plates, insures that the sod will be held securely, and will not fall off. A "basket" is formed with the forks, the standard or mast assembly on which the forks are mounted, and the operable side plates, to securely hold the sod in place.

With the forks tilted backwardly and the sod securely held on the pallets, the machine can be used for transporting a pallet full of sod from the truck to the place where it is to be laid, and then the fork can be lowered, tilted forward to release the plates, and the sod can be pulled off the pallet and laid directly in place. Once the sod has been laid, the machine is provided with floatation tires which cover a substantial width and can be used for packing or rolling the sod. By making two passes, the spaces previously left are rolled and the entire width of the machine is completely packed or rolled.

The showing of the present invention is schematic as to the frame and operating mechanisms, because they can be of any desired form. However, the features of using the wide floatation tires for packing the sod and the substantial tilt back of the forks in combination with side plates which hold the sod in place on the forks greatly increase the usability of the device, specifically in laying sod.

It should be noted that the tilting cylinders of the present invention are positioned above the operator, and out of the way of the frame and other mechanisms so that the substantial tilt can be achieved through the use of the single hydraulic cylinder operated in a normal manner.

The forks can be standard forks mounted on upright sliders for raising and lowering, and are hydraulically operated for such raising and lowering. Because great height of lift is not needed, (forks are used for loading and unloading trucks and are used adjacent to the ground) the mast for the forks does not have to be in a plurality of sections.

BRIEF DESCRIPTION OF THE DRAWINGS

FIG. 1 is a side elevational view showing a machine made according to the present invention in position to lift a pallet of sod from a truck shown fragmentarily;

FIG. 2 is a front elevational view of the machine of FIG. 1;

DESCRIPTION OF THE PREFERRED EMBODIMENT

Figure 3:
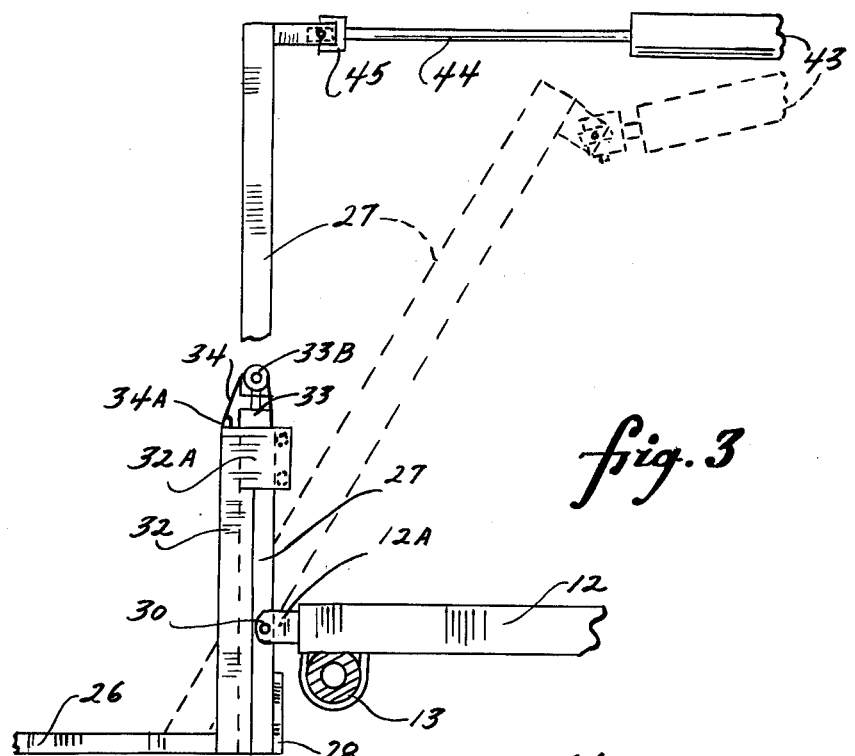
FIG. 3 is a fragmentary, vertical sectional of the device taken as on line 3—3 in FIG. 2.

Referring to FIG. 1, a lift truck device made according to the present invention is shown at 10, and includes a main frame 11 that is only shown schematically. The frame as will be more fully seen is made relatively lightweight, so that the weight of the machine is kept down. The frame includes fore and aft extending side members 12, which extend along the sides of the machine and also mount an axle and differential 13 at the front of the machine. The rearward portions of the side members 12 are joined together with an overhead bridge construction 14 which has counterweights thereon. The overhead bridge construction 14 overlies a wheel 15 that mounts a wide flotation tire. The wheel 15 is mounted on a pivot support assembly 16. The support 16 includes an arm 16A that is braced and fixed to the frame 12 and extends into the wheel and carries a yoke 16B. A pin 16C is pivoted in the yoke and carries a hub 16E for the wheel 15. The axis of pin 16C is centered on the wide tire and wheel 15 for ease of steering. A lever 16D is connected to pin 16C and is controlled by a drag link 17 actuated from a steering wheel 18 through conventional steering mechanism. The wheel 15 pivots underneath the bridge 14 as it is steered.

The forward axle 13 is used for mounting a pair of hubs that in turn drive wheels 20 which have wide flotation tires thereon. The tires themselves are substantially fifteen inches wide, and have a level tread much like a racing car tire. The wide tires permit the machine to be used to pack sod after it has been laid.

The side frame members 12 each have a pair of spaced ears 12A that extend forwardly of the axle 13 as perhaps is best seen in FIG. 3, and the ears 12A of each pair are spaced apart and are used for pivotally mounting a mast assembly 25 that is used for mounting a fork 26 comprising two prongs that are spaced apart in a usual manner. The mast assembly 25 as shown is relatively simple in this form of the invention, because high lift is not required, and comprises a pair of guide rails or bars 27, 27 which are connected by a lower cross frame member 28. The guide bars 27 are each fitted between a pair of ears 12A and are pivotally mounted to the respective ears with a pin 30 to permit pivoting of the mast assembly about a transverse horizontal axis from a position wherein the forks 26 are substantially parallel to the ground, or with the outer ends tilted downward slightly, to a position wherein the upper ends of the upright rails 27 are tilted a substantial distance rearwardly and the outer end of the fork extends upwardly. The mast assembly 25 can be of any desired configuration, but as shown the fork members 26 are mounted onto a pair of sliding members 32 each of which is slidably mounted on a different one of the upright rails 27. The members 32 may be suitably connected together with one or more cross members, for example 28A adjacent forks 26, and are controlled by a pair of parallel connected hydraulic cylinders 33 that have base ends mounted to the cross member 28 and have extendable and retractable rods with rod ends 33A extending upwardly. The upper ends thereof bear against the rear of the rails 27 and hold the fork in position on the rails.

The rod ends of the cylinders 33 carry rotatably pulleys 33B over which cables 34 are mounted. One end of each of the cables 34 are connected to the respective sliding member 32 as at 34A. The cables are passed over the pulleys on the aligning cylinder and the second ends of the cables are anchored back at the hydraulic cylinder. Thus, for each foot of travel of the cylinders 33 the fork will move two feet.

The machine is powered with an engine shown schematically at 35, which is mounted onto the frame 11, and has an output drive shaft for driving through a conventional clutch to a pair of series connected transmissions shown schematically at 36, which drive the differential assembly of the axle 13 in conventional manner. The engine and transmission are shown only schematically. With two transmissions in series a wide selection of gear ratios can be achieved for driving the front drive wheels 20. The engine is situated just to the rear of an operator's seat 37, that can be of any desired configuration, and which is adjacent steering wheel 18. Suitable hydraulic valves 38 can be mounted adjacent the operator so that he can control the various cylinders. The valves are of usual design, and will control flow from a hydraulic pump that in turn is powered by the engine 35.

Figure 4:
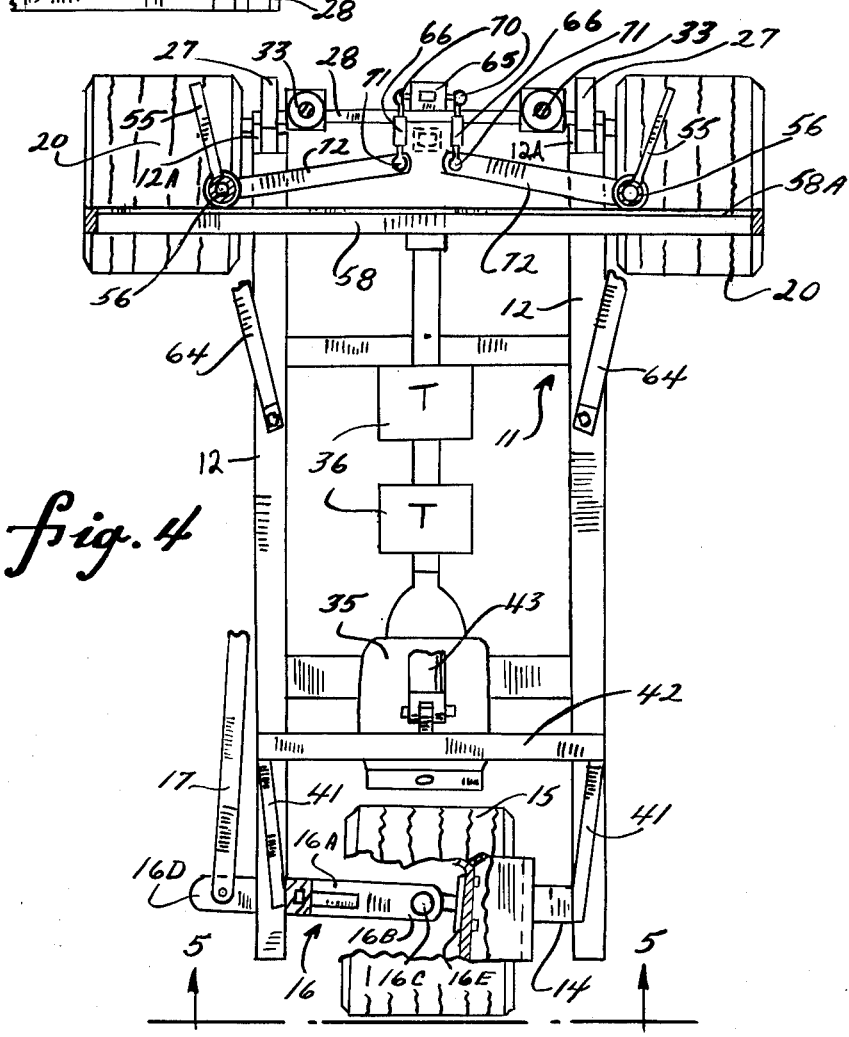
FIG. 4 is a top schematic plan view of the device of the present invention with the fork and controls removed and other parts broken away.
Figure 5:
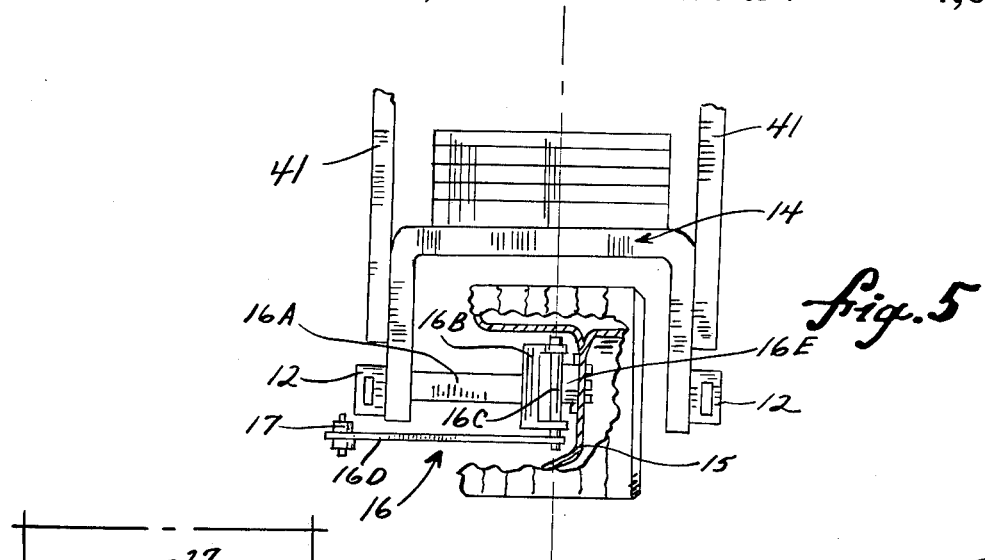
FIG. 5 is a fragmentary rear view taken generally along the lines 5—5 of FIG. 4.
Figures 6, 7:
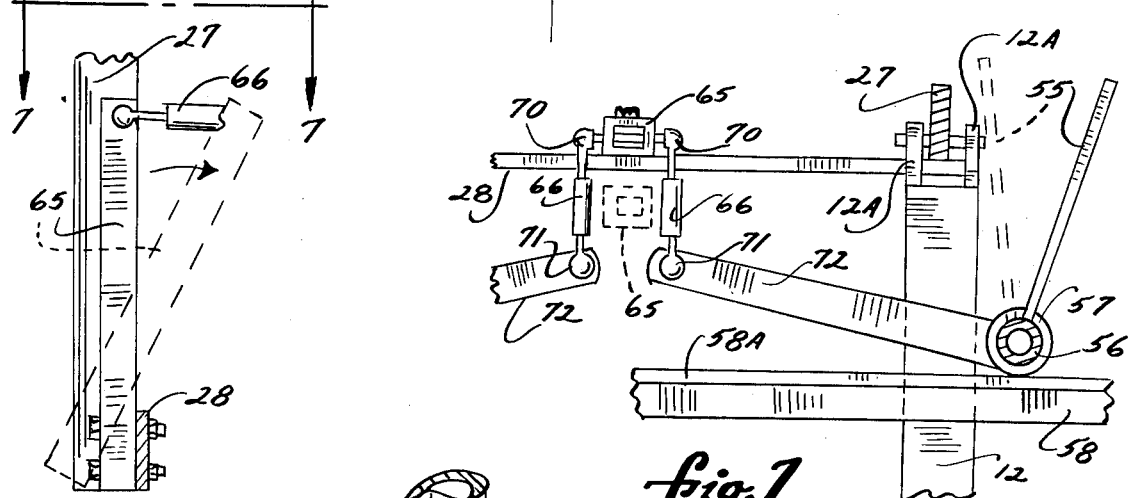
FIG. 6 is an enlarged schematic representation of the lower portion of the mounting of the fork in the main frame in the device of the present invention.
FIG. 7 is a view taken generally along 7—7 in FIG. 6 showing schematically the operation plates which can be operated to clamp sod.
Figure 9:
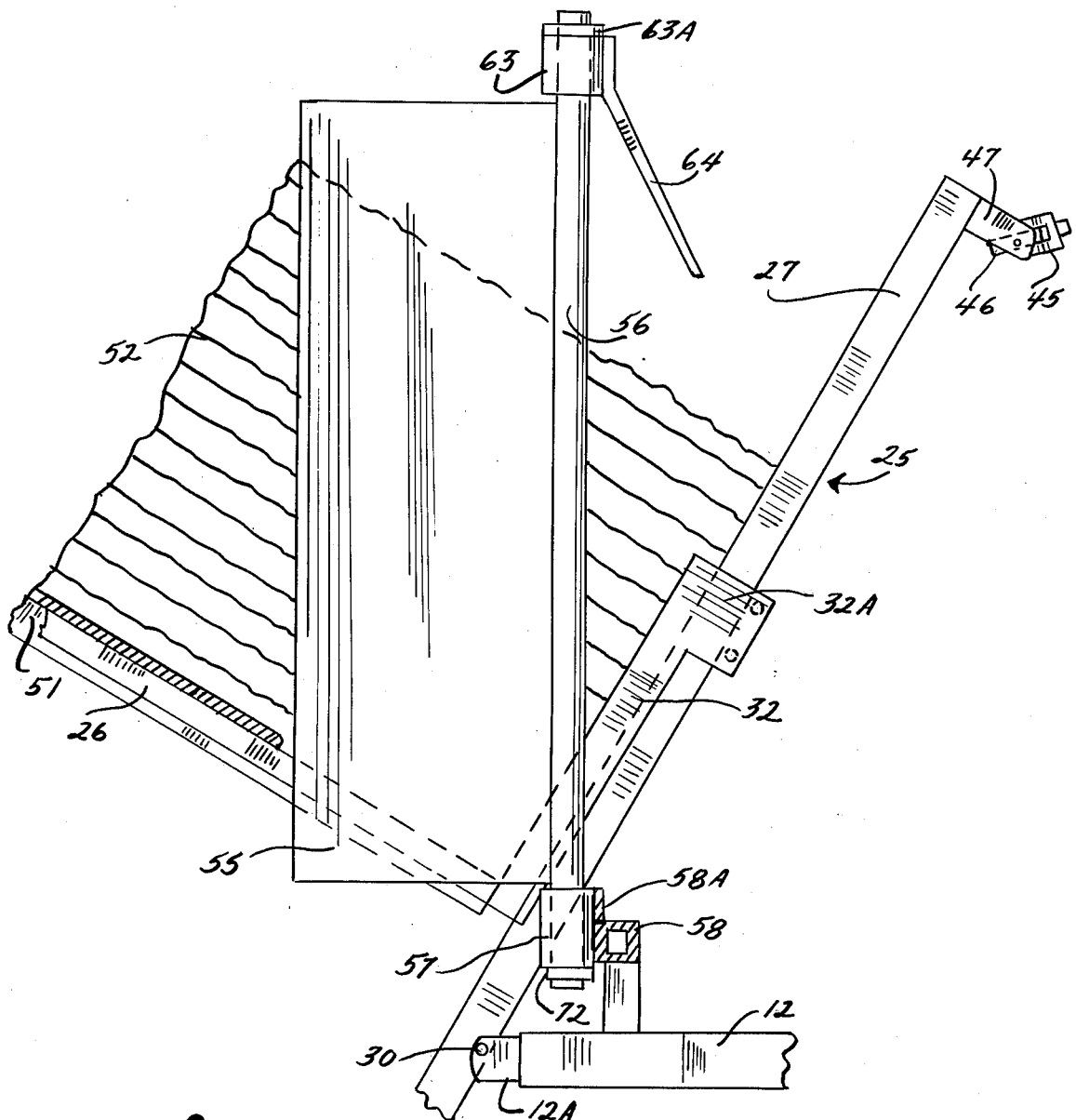
FIG. 9 is an enlarged representation of a pallet of sod held on a fork made according to the present invention and with the fork tilted rearwardly to form a "basket" for holding the sod.

The frame 11 includes a pair of rear upright members 40 which are braced rearwardly with braces 41 attached to the bridge 14, and at the upper end of the upright members 40, a cross member 42 is mounted (FIG. 4). A hydraulic cylinder 43 is attached to the cross member 42 on an ear and with a pin so that it can pivot about a generally horizontal axis. The cylinder 43 extends forwardly and is a double acting cylinder having an extendable, retractable rod 44 that in turn has a rod end 45 attached to a cross member 46. The cross member 46 in turn is pivotally attached about a horizontal pivot axis between a pair of brackets 47, which in turn are fixed to the upper ends of the upright members 27, 27, respectively. Actuation of the cylinder 43 causes the rod 44 to travel in and out, and will cause the upright rails 27 to tilt fore and aft about pivot pins 30. Because there are no interfering frame members directly behind the rails 27, as shown, the mast assembly 25 can be tilted back a substantial distance as shown in dotted lines in FIG. 3, for example, and also as shown in FIG. 9, and may be tilted as much as thirty to thirty five degrees rearwardly. The cylinder 43 can be used for supporting a sun shade, if desired, and of course the upright members 40 can be reinforced as much as necessary for carrying the loads required for tilting the mast assembly.

In the handling of sod on pallets, for example when removing sod from a truck shown at 50 in FIG. 1, using pallets of conventional design indicated at 51 into which the forks 26 will slide, normally a good bit of the sod has been lost when the lift truck is moved, because the sod is not held properly. In the present device, the sod is laid in strips indicated at 52 in FIG. 1 on top of the pallet 51. In order to satisfactorily utilize such sod strips, they are generally cut in lengths one and one half feet wide by four feet long and laid side by side on the pallets, with the one and one half foot widths oriented to extend laterally across the pallet to give a three foot by four foot pallet. The three foot distance is the width, and the four foot length extends in the same direction as the forks 26. The fork lift truck 10 can be moved to position the forks 26 under the pallet 51, and then the forks can be lifted by operation of suitable valve operating cylinders 33 and moving the forks upwardly slightly along the rails or supports 27 of the mast assembly 25. In the present device, when this is done, the fork can be tilted rearwardly and a pair of side guide and retainer plates indicated at 55, 55 on opposite sides of the pallet will be used to hold the sod to prevent the strips of sod 52 from falling off the sides of the stack. The mast assembly is situated so that the rear of the forks are slightly to the rear of the forward edge of the side plates 55, and the pallet will fit between the guide and retainer plates 55 so that the pallet and the sod will rest against the sliding members 32.

Figure 8:
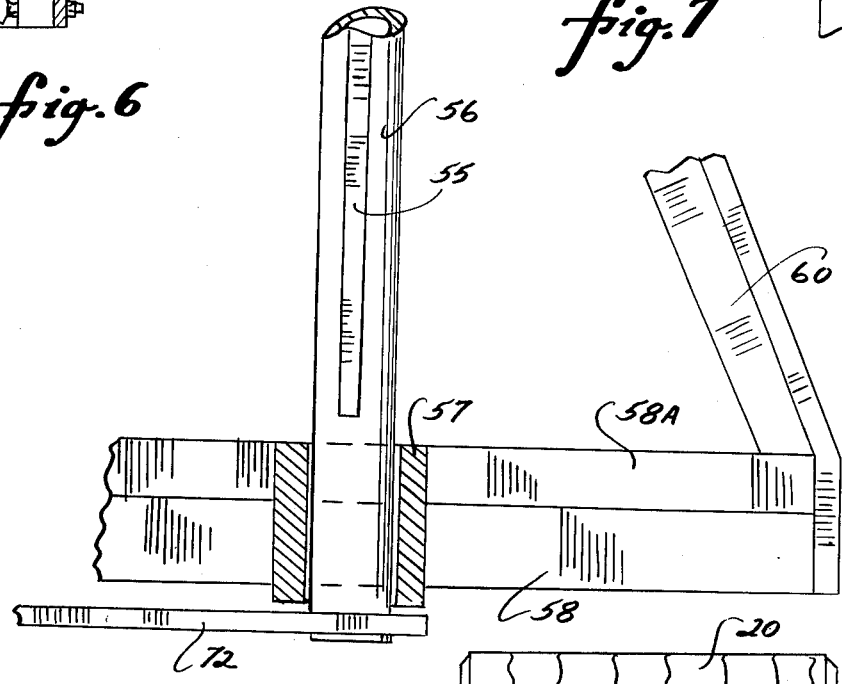
FIG. 8 is a fragmentary front view of the lower portion of a side plate and support therefore, with the guide plate shown directly as an edge view.

The side plates 55 as shown are mounted onto upright pivot tubes 56 on opposite sides of the machine. The tubes 56 are pivotally mounted on the machine about upright axes. As shown the tubes 56 are held at their lower ends by short tubular sleeves 57 into which they rotatably mount. The tubes 56 extend through the sleeves 57 a short distance and control arms 72 are welded to the lower ends of the tubes 56. These sleeves 57 (FIGS. 1, 8 and 9) are attached to a cross frame member 58 which is fixed on suitable upright members 59 back down to the frame assembly 11. The cross frame member 58 is positioned to be just slightly above the drive wheels 20. The frame member 58 extends laterally over the top of the wheels 20 and extends almost to the full width of the machine, as shown in FIG. 2. A reinforcing bar 58A may be welded to the top of member 58.

Diagonal braces 60 are mounted at the opposite ends of the cross frame 58 and extend upwardly (FIG. 2), and support upper pivot sleeves 63 which receive the upper portions of the tubes 56. The upper ends of tubes 56 extend above the sleeves 63 and can have collars 63A attached to the tubes 56 to support the tubes 56 as they pivot.

Additional diagonal braces 64 extend from and support sleeves 63 back at the side members 12. The braces 63 are positioned so that they do not interfere with the rearward tilting of the mast assembly 25.

The sleeves 57 and 63 pivotally mount the upright tubes 56 and thus they also pivotally mount the side plates 55 which are fixed to tubes 56. The rotational position of the tubes 56 about their axes is controlled by the tilting of the fork. In other words, the side plates 55 can be moved and actuated to squeeze against the sides of layers of sod on a pallet held by the fork.

As shown perhaps best in FIGS. 2, 4, 6 and 7, the cross member 28 of the mast assembly has an upright actuator arm or tube 65 mounted thereon at the center line of the fork. The upright arm 65, therefore, moves with the mast assembly when it is pivoted and has relative motion with respect to cross member 58 when the mast assembly is pivoted as previously explained by operation of the cylinder 43.

At the upper end of the arm 65, which extends up for approximately two feet above the bottom of the mast assembly, a pair of links 66 are mounted to the arm 65 through swivel connections 70, 70, such as ordinary tie rod ends used in automotive steering links. These tie rod ends have studs that mount onto the arm 65 and have threaded shank portions that threadedly mount into sleeves forming part of the links 66 for length adjustment. The opposite ends of the links 66 also mount threadably adjustable tie rod ends 71 which are connected to actuator arms 72 that are fixed to the lower ends of tubes 56.

The arms 72 can be reinforced with suitable gussets and positioned to clear the frame member 58 as they are moved. The arms 72 control the pivotal movement of the tubes 56 about their upright axes and in turn are controlled by arms 65 and links 66. This means that when the upper end of arm 65 moves back and forth as the mast for the fork is tilted, the ends of the arms 72 will move back and forth as well under control of links 66. This will cause the arms 72 to pivot the tubes 56 about the axes of the tubes. This pivoting of the tubes 56 causes the side plates 55 to also pivot about the tube axes. When the arm 65 moves rearwardly the outer (forward) edges of the side plates 55 will tend to move toward each other. The links 66 are adjustable in length much like a turn buckle. The links 66 are adjusted to insure that the side plates 55 taper outwardly at their outer edges as shown in FIGS. 1 and 4 when the mast assembly is in position with the forks 26 horizontal. The plates 55 therefore will not interfere with the loading of a pallet 51 when the fork is used to remove such a pallet from the truck.

When the mast assembly 25 is tilted rearwardly by the operation (retraction) of the cylinder 43, so that the pallet of sod strip 52 moves rearwardly between the plates 55, the arm 65 moves relative to the frame 58 and will push on links 66 causing the outer ends of arms 72 to move rearwardly. Tubes 56 will be pivoted and the plates 55 will start to pivot so that the outer edges move inwardly or toward each other, and the plates will therefore engage and hold the sod strips along the sides of the pallet stack under a variable force determined by the amount of rearward tilting of the fork.

As shown in FIG. 9, the side plates 55 have moved against the sod strips 52 shown on pallet 51, and with the mast assembly 25 tilted rearwardly a "basket" is formed. Sides are formed and the sliding members of fork form the rear.

In this manner the sod is held very securely for transport from the truck to the place where the sod is being laid. The sod will not fall off the sides of the stack during such movement.

Once at the location where the sod is to be laid, the fork can be tilted forwardly somewhat releasing the side plates 55 by reverse action of the arm 65, links 66 and actuator arms 72, and then the fork can be lowered downwardly to position the stack of sod strips adjacent the ground at a level where the stack can be reached easily by a person laying the sod. If desired the fork can be lowered while the side plates 55 retain some holding force on the sod strips. The amount of tilting of the mast assembly controls the force with which the side plates 55 grip the sod. The sod strips can be pulled off the pallet stack much like feeding sheets of paper from a stack. If the sod is to be released fully, the fork merely has to be tilted to a level position and the plates 55 will not be directed inwardly.

The plates 55 thus are positioned approximately a little over three feet apart to permit the side by side strips of sod each one and one half feet wide to fit between the plates.

Once the sod is laid, and even as it is laid, the lift truck can drive over the sod with the flotation tires without excessive compaction. The tire pattern can be visualized in FIGS. 4 and 2. There are gaps between the inner edges of the forward or front tires and the outer side edges of the rear tire but these gaps are less or at least not substantially greater than the width of the tires. Such gaps are indicated at 20A in FIG. 2. Then the lift truck can be moved sideways for the next pass to pack or roll strips missed. The sod is packed quickly and conveniently by the flotation tires.

The method of laying sod is also improved where pallets of sod strips positioned side by side are used. The sod is loaded on pallets in the field, transported by truck to the work location and removed with the lift truck. The sod is held along its sides by the plates under pressure and can be held by the fork while it is removed and laid. The side plates permit moving the lift truck as the sod is laid to eliminate carrying the sod strips by hand.

The fork lift truck acts much like a sod dispenser that moves along and holds the strips securely in a stack until they are pulled off and dropped in place. The strip can be dropped almost straight down for placement because the lift truck can be driven along the newly laid sod with the flotation tires without damaging the sod. Efficiency is improved and labor costs are greatly reduced. The flotation tires permit one pass, a slight side shift, and another pass to cover a substantial width.

The placement of the steering pin for the wheel inside the wheel makes mounting the wide tire much simplier and eliminates side steering loads. The arrangement can be used in any three wheel vehicle.

The flotation tires and front weight and drive permit climbing very steep grades, up to about 35 or 40 degrees. Thus the machine is very versatile.

What is claimed is:

1. A sod handling apparatus for loading and unloading pallets of sod, including a mobile machine frame having means for supporting and propelling the machine over the ground, a lift fork member at one end of said frame including means for lifting and lowering pallets generally vertically, a pair of uprightly extending guide members mounted to said frame adjacent the sides of said lift fork member for guiding sod stacked on a pallet held on said lift fork member and preventing substantial movement sideways of said sod on a pallet being held, means to mount said guide members on said frame independently of said lift fork member and adjacent the lateral sides thereof, said means to mount said guide members on said frame including means to pivotally mount said guide members about substantially vertical axes, lever means connected between said lift fork member and said guide members to cause said guide members to be pivoted about said vertical axes toward each other in response to the pivoting of lift fork member about said horizontal axis by said power means, means to mount said lift fork member to said frame about a generally horizontal axis and power means to tilt the lift fork member about said generally horizontal axis relative to said frame and said guide members from a position wherein a substantial portion of said lift fork member extends outwardly from said frame beyond said guide members to a position wherein substantial portions pf said lift fork member are between said guide members.

2. The combination as specified in claim 1 wherein said means to support said machine comprises a three wheel support for said frame, said three wheels including flotation tires of substantial width, said three wheel support including a center wheel and outer side wheels, and wherein the space between the inner edges of said outer side wheels and the outer edges of said center wheel is not substantially greater than the width of said flotation tires.

3. A sod handling apparatus for loading and unloading pallets of sod, including a mobile machine frame having means for supporting and propelling the machine over the ground, a lift fork member at one end of said machine including an uprightly extending mast pivotally mounted to said frame about a generally horizontal axis, means for lifting and lowering said lift fork member relative to said mast for handling pallets of sod, and guide plate members adjacent the sides of said lift fork member for guiding sod stacked on a pallet held on said lift fork member and preventing substantial movement sideways of said sod on a pallet being held, means to pivotally mount said guide plate members on said frame about generally upright axes adjacent to and independent of said lift fork member, tilt means connected between the frame and mast to tilt said lift fork member about said generally horizontal axis, said tilt means including means connecting one end thereof to the upper portion of said lift fork member, means mounting the other end of said tilt means to said frame at substantially the same level as said one end when said lift fork member is in a substantially vertical position and means connected between said lift fork member and each of said guide plate members to cause pivoting of said guide plate members, whereby outwardly extending edges of said guide plate members move toward said lift fork member in response to the tilting of the upper portion of said mast toward said frame.

4. The combination specified in claim 3 wherein said guide members comprise a pair of side plates, one pivotally mounted on each side of said lift fork member adjacent the mast and extending forwardly and alongside the lift fork member, and wherein said means connected to cause pivoting of said side plates comprises an arm member mounted on said mast, and linkage means connected between said arm member and said side plates to cause pivoting of said side plates as said mast is tilted.

5. A sod handling apparatus as recited in claim 3 wherein said tilt means includes hydraulic piston-cylinder means.

6. A sod handling apparatus as recited in claim 5 wherein said mobile machine frame includes an operator's seat thereon and said means mounting the other end of said tilt means is located rearwardly of said operator's seat.

7. A sod handling apparatus as recited in claim 6 including means mounting said horizontal axis below said guide plate members and forwardly of said means to pivotally mount said guide plate members and wherein said hydraulic piston-cylinder means is operative to tilt said lift fork member about said horizontal axis to that a substantial portion of said lift fork member is positioned rearwardly of said guide plate members.

8. A sod handling apparatus as recited in claim 3 wherein said means for supporting and propelling said mobile machine frame over the ground includes a pair of drive wheels and a steerable wheel, means mounting said steerable wheel to said frame including a support member fixedly mounted on said frame and extending to the central portion of said steerable wheel from one lateral side thereof, a wheel mounting member supporting said steerable wheel, and means to pivotally mount said wheel mounting member to said support inside said steerable wheel about a generally vertical axis.

9. The method of transporting and laying strips of sod with a pallet, a vehicle having pivotal lift fork means, clamping means, forward and rear support flotation tire means comprising the steps of: stacking flat unrolled strips of sod side by side on top of each other on said pallet until a desired height is reached; placing said pallet on the lift fork means, pivoting said lift fork means, pallet and strips of sod thereon from a first position to a second position substantially between said clamp means and simultaneously clamping said stacks of sod strips with said clamping means; transporting the pallet and sod strips to a location where the sod strips are to be laid; pivoting said pallet and strips of sod from said second to said first position and simultaneously releasing said clamping means from said stacks; removing individual strips of sod from the respective stacks; laying the removed strips of sod on the ground and compacting the strips of sod into the ground by travelling over the laid strips with said fork lift vehicle.

* * * * *